United States Patent [19]
Shepard

[11] Patent Number: 5,682,382
[45] Date of Patent: Oct. 28, 1997

[54] SCALABLE, SELF-ORGANIZING PACKET RADIO NETWORK HAVING DECENTRALIZED CHANNEL MANAGEMENT PROVIDING COLLISION-FREE PACKET TRANSFER

[75] Inventor: Timothy Jason Shepard, Belmont, Mass.

[73] Assignee: Massachusetts Institute of Technology, Cambridge, Mass.

[21] Appl. No.: 523,715

[22] Filed: Sep. 5, 1995

[51] Int. Cl.⁶ ................................................. H04L 12/56
[52] U.S. Cl. ........................... 370/342; 370/348; 370/349
[58] Field of Search ................... 370/85.2, 94.1, 370/18, 94.2, 94.3, 310, 320, 321, 335, 349, 913, 441, 348; 375/205, 206, 208, 200, 203

[56] References Cited

U.S. PATENT DOCUMENTS

| | | | |
|---|---|---|---|
| 5,136,612 | 8/1992 | Bi | 370/18 |
| 5,224,122 | 6/1993 | Bruckert | 370/18 |
| 5,394,434 | 2/1995 | Kawabe et al. | 375/205 |
| 5,459,758 | 10/1995 | Moore, III | 375/208 |
| 5,463,660 | 10/1995 | Fukasawa et al. | 375/205 |

OTHER PUBLICATIONS

"Evaluation of a Distributed TDMA Rescheduling Procedure for Mobile Packet Radio Networks", by Stevens et al., MILCOM '91, (pp. 1167–1171, 1991).

"Throughout Enhancement of Direct–Sequence Spread–Spectrum Packet Radio Networks by Adaptive Power Control," Sheikh et al., appearing at IEEE Trans. Commun., vol. Com–42 No. 2/3/4 (pp. 884–890, Feb./Mar./Apr. 1994).

(List continued on next page.)

Primary Examiner—Wellington Chin
Assistant Examiner—Soon D. Hyun
Attorney, Agent, or Firm—Albert Peter Durigon

[57] ABSTRACT

A scalable, self-organizing packet radio network providing decentralized collision-free packet transfer is disclosed having spread-spectrum transmitters and receivers for eliminating contention from background noise, spread-spectrum receivers with multiple tracking and despreading channels for eliminating contention from multiple transmitters contending for the same receiver at the same time, and a processor implemented scheduling technique for eliminating contention arising both from self-contention and from comparatively-high power transmissions of neighboring stations. In the preferred embodiments, the processor implemented scheduling technique randomly provides a unique schedule of transmit and receive opportunities for each station. In accord therewith, each station obliges itself to listen and publishes the unique schedule of each station to every neighboring station. To avoid self-contention, a packet is transmitted to an intended station at a time that corresponds to the first available listening opportunity thereof that is long enough to receive the packet. To avoid contention arising from comparatively-high power transmissions of neighboring stations, a packet is transmitted to an intended station at a time that corresponds to the first available transmit opportunity thereof that does not overlap with the receive windows of any neighboring station. In the preferred embodiments, a processor implemented power control technique is disclosed which so varies transmitter power as to provide a fixed level of power at any intended recipient station. In the preferred embodiments, minimum energy routing is employed for specifying intended stations for multi-hop packet transfer. In the presently preferred embodiments, the random generation at each station of its unique schedule is implemented by a pseudo-random schedule generator common to all stations and by a pseudo-random clock unique to each station. In the presently preferred embodiment, neighboring stations periodically exchange rendezvous packets that include information representative of each station's pseudo-random clock, transmitted power and station identity.

24 Claims, 5 Drawing Sheets

OTHER PUBLICATIONS

"Making Transmission Schedules Immune to Topology Changes in Multi-Hop Packet Radio Networks," Chlamtac et al., appearing at IEEE International Conference On Communications '93 (pp.1854–1858, 1993).

"Traffic Sensitive Algorithms and Performance Measures for the Generation of Self–Organizing Radio Network Schedules," Shor et al., appearing at IEEE Trans. Commun., vol. Com–41 No. 1. (pp. 16–21, Jan. 1993).

*Data Networks*, by Demitri Bertsekas and Robert Gallager, (pp. 274–282, Prentice–Hall, 1987).

*Spectral Efficiency Considerations for Packet Radio*, Phil Karn, appearing at 10th Computer Networking Conference, (pp. 62–66, 1991).

*The Throughput of Packet Broadcasting Channels*, Norman Abramson, appearing at IEEE Trans. Commun., vol. Com–25 No. 1 (pp.117–128, Jan. 1977).

*Crosslink Architectures for a Multiple Satellite System*, Binder et al., appearing at Proceedings of the IEEE, vol. 75, No. 1, (pp. 74–82, Jan. 1987).

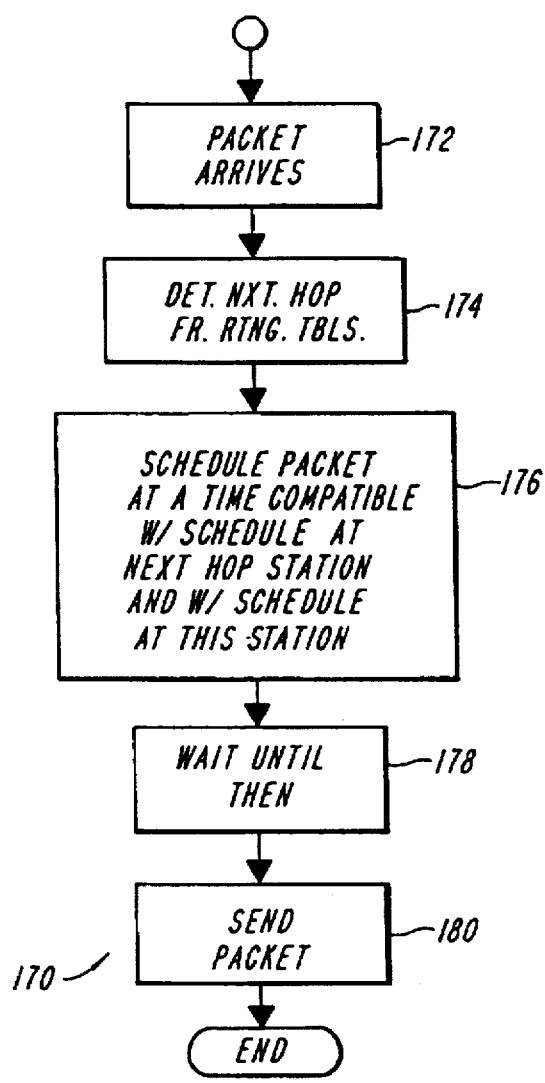
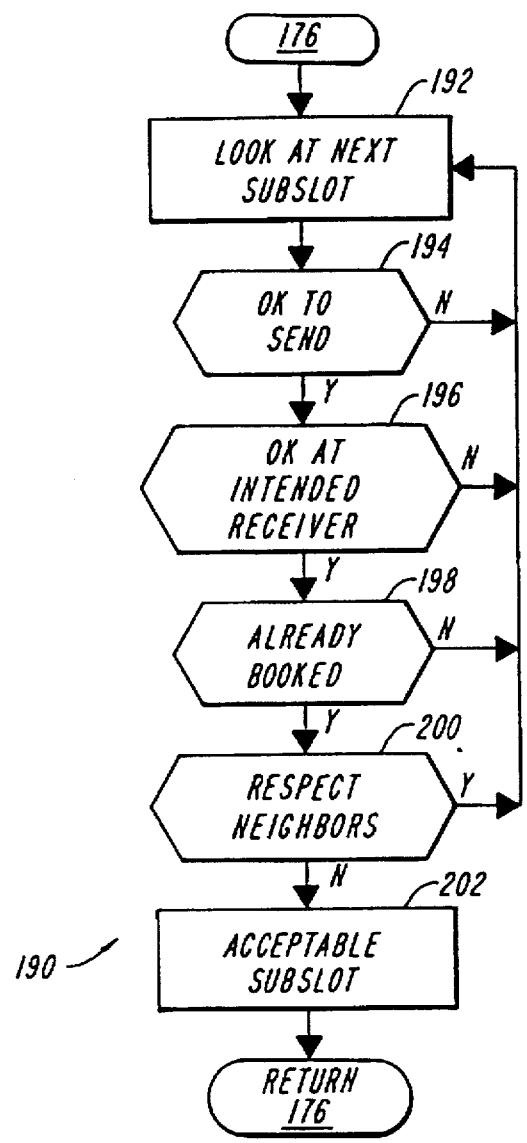
FIG. 10
FIG. 11

SCALABLE, SELF-ORGANIZING PACKET RADIO NETWORK HAVING DECENTRALIZED CHANNEL MANAGEMENT PROVIDING COLLISION-FREE PACKET TRANSFER

FIELD OF THE INVENTION

This invention is drawn to the field of communications, and more particularly, to a novel scalable, self-organizing packet radio network having decentralized channel management providing collision-free packet transfer.

BACKGROUND OF THE INVENTION

A packet radio network consists of a number of packet radio stations that communicate with each other. The packet radio network carries messages in packets like a wired packet network, with stations forwarding each packet separately, but uses radio signals instead of wires to carry the packets between stations. In a multi-hop packet radio network, each station participates cooperatively in forwarding traffic between other stations, thereby extending the communication range of each station to include all transitively reachable stations.

Without some form of contention control for packet radio networks, packets could be lost either from interference or from multiple transmitters contending for the same receiver at the same time. There are two different techniques for contention control known in the art, one (global) is control of contention on a network-wide basis and the other (distributed) is local control of contention. The network-wide contention control techniques typically require such coordination between all stations as to provide an exclusive one-at-a-time use of the channel. Global coordination techniques are disadvantageous to the extent that global coordination is made the more difficult the greater is the number of stations and insofar as exclusive one-at-a-time channel usage could result in global system failure should any single station fail to observe the network-wide coordination. Reference may be had to a book entitled *Data Networks*, by Demitri Bertsekas and Robert Gallager, (pp 274–282, Prentice-Hall, 1987), for a general survey of the network-wide contention control techniques, incorporated herein by reference.

The heretofore known local control of contention techniques in general allow collisions to occur and use hop-by-hop acknowledgements and re-transmissions when needed to recover the lost packets. Reference may be had to an article by Karn entitled *Spectral Efficiency Considerations for Packet Radio*, appearing at 10th Computer Networking Conference, (pp 62–66, 1991), to an article by Abramsom entitled *The Throughput of Packet Broadcasting Channels*, appearing at IEEE Trans. Commun., Vol. Com-25 No. 1 (pp. 117–128, Jan. 1977) and to an article by Binder et al. entitled *Crosslink Architectures for a Multiple Satellite System*, appearing at Proceedings of the IEEE, Vol. 75, No. 1, (pp. 74–82, Jan. 1987) for descriptions of such distributed control techniques for radio packet networks, each incorporated by reference. Karn, supra at p 65, advocates local contention control "schemes that rely on receiver feedback (as opposed to channel sensing at the transmitter) to avoid collisions," whereas Abramson lists receiver feedback contention control together with "transponder packet broadcasting," "carrier sense packet broadcasting" and "packet recovery codes." Binder et al describe a local contention control scheduling technique for a multiple satellite packet radio system, which (i) combines each satellite pairwise with each of its neighbors to generate for each pair a random schedule of alternating transmit and receive windows which specifies when that satellite agrees to transmit and receive with each of its neighbors, (ii) merges the schedules of all pairs to determine if that satellite is scheduled to receive packets from two or more of its neighbors in overlapping time, and (iii) in the event of overlapping, reschedules the transmission of the satellite whose receive window is later (in the absence of priority) to another time (and notes that the re-transmission thereby required is wasteful of transmission power).

Therefore, there is a need for a packet transfer control technique that takes into account potential contention is such manner that ensures that transmitted packets are not interfered with at the intended receiver without requiring global coordination or synchronization and without requiring that packets lost due to collisions be retransmitted, which wastes resources.

SUMMARY OF THE INVENTION

Accordingly, it is the principal object of the present invention to provide a scalable, self-organizing packet radio network having decentralized channel management providing collision-free packet transfer in a manner that requires neither global network coordination control nor such distributed network control that retransmits packets lost due to collisions. The scalable, self-organizing packet radio network having decentralized channel management providing collision-free packet transfer of the present invention may be implemented for land-, sea-, air- and space-based applications without departing from the inventive concepts.

In accord with the scalable, self-organizing packet radio network providing decentralized, collision-free packet transfer of the present invention, first means are disclosed for eliminating at each station packet loss from contention appearing as background noise that arises from all of the stations that may be on the network at any given time and second means are disclosed for eliminating at each station packet loss from multiple other neighboring stations that may be in contention with a given station at a given time. In the presently preferred embodiments, the first means includes spread-spectrum transmitters and receivers providing spread-spectrum processing gains selected to overcome the background noise levels and the second means includes spread-spectrum receivers having multiple tracking and despreading channels.

In further accord with the scalable, self-organizing packet radio network providing decentralized, collision-free packet transfer of the present invention, third means are disclosed for eliminating at each station packet loss from its own transmitter contending with its own receiver for packets from one or more neighbors when it is transmitting to an intended neighbor and fourth means are disclosed for eliminating at each station packet loss from comparatively-high power transmission of one or more other neighboring stations. In the presently preferred embodiments, the third means includes a processor implemented first scheduling technique which randomly generates at each station a unique schedule of transmit and receive opportunities during which it obliges itself to either transmit or to listen, publishes its unique schedule to the other neighboring stations, compares its unique schedule with that of a neighboring station intended to receive the transmission to determine when packets may be transferred thereto during a receive opportunity thereof without collision, and which transmits its packets thereto at such times. In the presently preferred embodiments, the fourth means includes a processor implemented second scheduling technique which compares the unique schedules of the transmitting station and of one or more neighboring stations that are not intended to receive the transmission and which transmits its packet at times which do not overlap with any receive window of the other neighboring stations. In the presently preferred embodiment, the random generation at each station of its unique schedule is implemented by a pseudo-random schedule generator common to all stations and by a randomly-initialized clock unique to each station. In the presently preferred embodiment, neighboring stations periodically exchange rendezvous packets that include each station's pseudo-random clock, and the comparison at each station of its unique schedule of transmit and receive opportunities with the unique schedules of either its intended recipient or of each of its one or more neighboring stations is implemented by generating the schedules of the intended recipient or of the one or more neighboring stations from the pseudo-random clock of each of such neighbors.

BRIEF DESCRIPTION OF THE DRAWINGS

These and other objects, inventive aspects and advantageous features of the present invention will become apparent as the invention becomes better understood to those of skill in the art by reference to the following detailed description of the preferred embodiments, and to the drawings, wherein:

FIGS. 8, 9, 10, and 11 illustrate flow charts and data structures (FIGS. 8B, 9B) useful in explaining the operation of the presently preferred embodiment of the scalable, self-organizing packet radio network having decentralized channel management providing collision-free packet transfer in accord with the present invention.

DETAILED DESCRIPTION OF THE PREFERRED EMBODIMENTS

Figure 1:
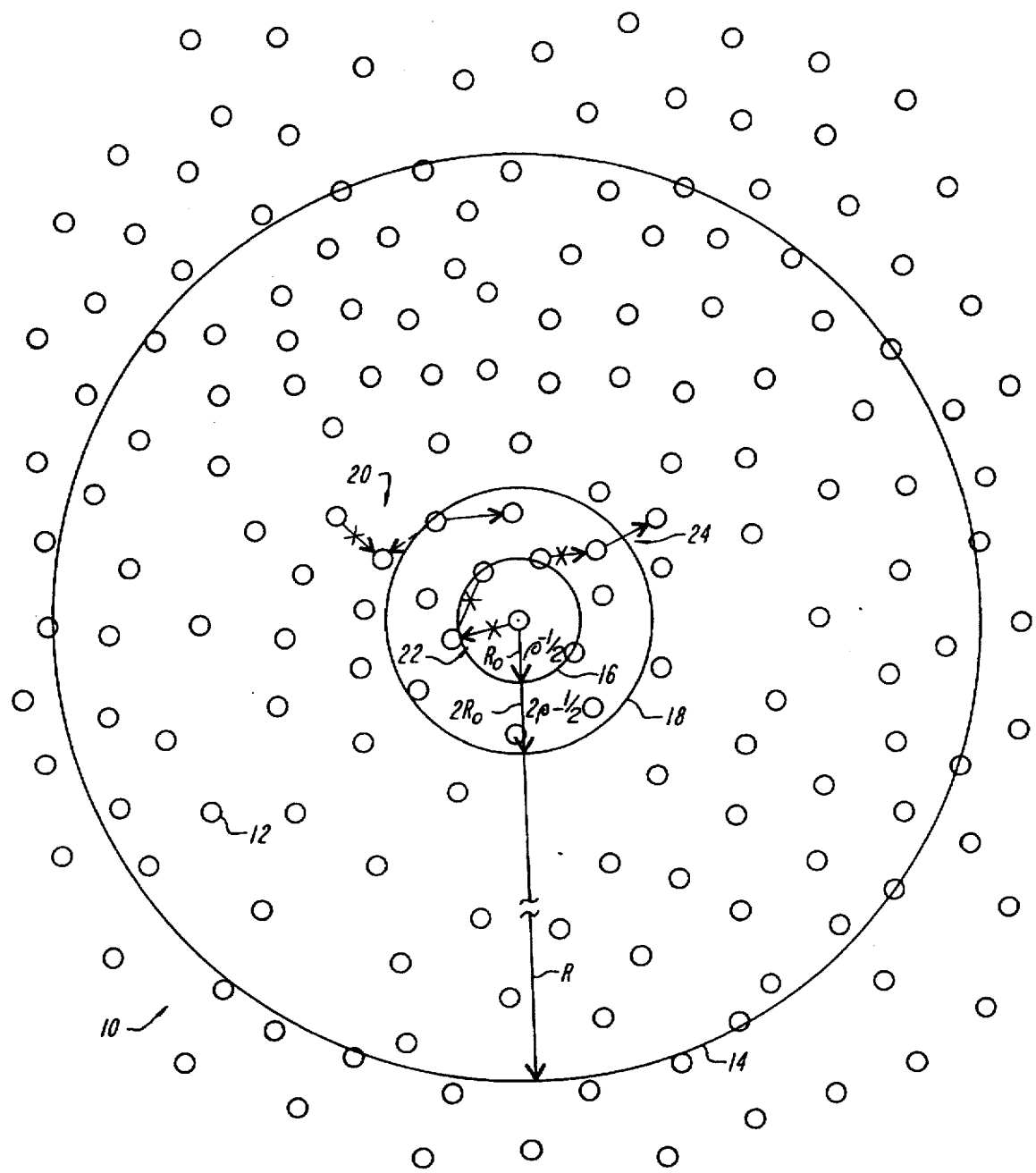
FIG. 1 is a not-to-scale pictorial view illustrating three different types of collisions useful in explaining how freedom from collision is obtained and illustrating first and second variable-radius neighborhoods about the central station useful in explaining how sealability and self-organizability are obtained in accord with the scalable, self-organizing packet radio network having decentralized channel management providing collision-free packet transfer of the present invention. The same variable-radius neighborhoods exist about the stations other than the central station.

Referring now to FIG. 1, generally designated at 10 is a pictorial view of a scalable, self-organizing packet radio network having decentralized channel management providing collision-free packet transfer in accord with the present invention, wherein packets of information are transmitted between stations 12, which may be fixed or mobile, from source to destination. Upon receipt of a packet, each station 12 demodulates and decodes the packets in order to perform store-and-forward processing. The packet address is inspected and routing rules applied to determine its next immediate destination. Typically, a packet will undergo several store-and-forward hops before being transmitted to its final destination.

Figure 2:
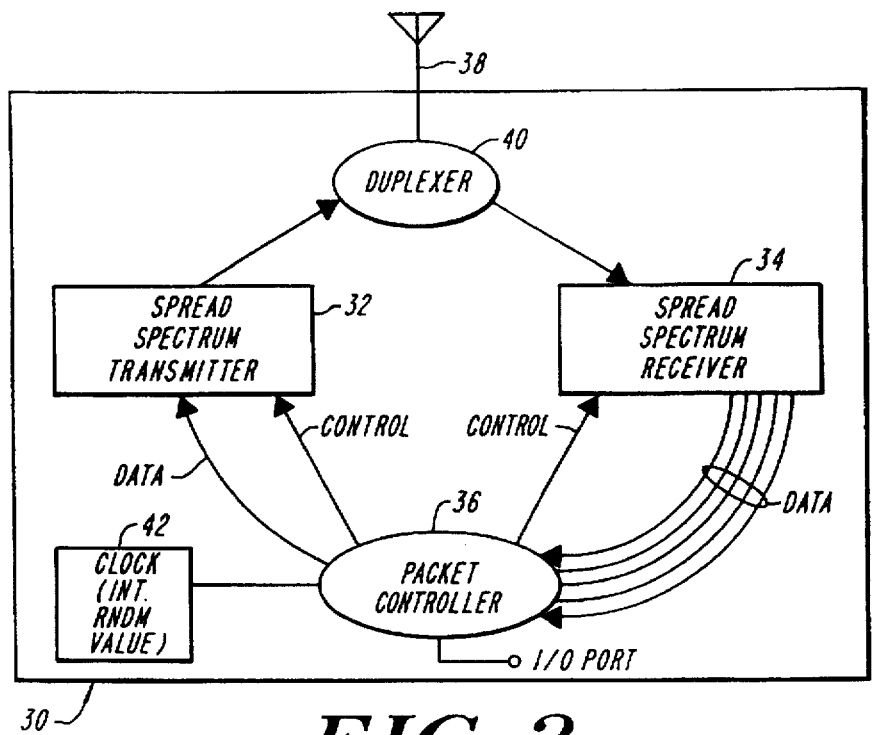
FIG. 2 is a block diagram of an exemplary embodiment of a scalable, self-organizing packet radio network station having decentralized channel management providing collision-free packet transfer in accord with the present invention.

Referring now briefly to FIG. 2, generally designated at 30 is a block diagram of a packet radio station in accord with the present invention. Each station 30 includes a spread-spectrum transmitter 32 and a spread-spectrum receiver having multiple tracking and despreading channels 34 operatively coupled to a packet radio controller 36 via respective data and control lines. As appears more fully hereinbelow, the spread-spectrum transmitter and receiver eliminate at each packet radio station packet loss from contention appearing as background noise, while the spread-spectrum receiver having multiple tracking and despreading channels 34 eliminates at each station packet loss from multiple other neighboring packet controllers contending for the receiver at the same time. An antenna 38 is connected via a duplexer (circulator) 40 to the spread-spectrum transmitter and spread-spectrum receiver having multiple tracking and despreading channels 32, 34, although in alternative embodiments dual antennas may be employed without departing from the inventive concepts. A clock 42 is coupled to the packet radio controller 36 whose reading is initialized to a random value unique to each station in a manner described below. As appears more fully hereinbelow, the packet radio controller 36 is implemented with first and second scheduling techniques that eliminate packet loss from its own transmitter contending with its own receiver and packet loss from comparatively-high power transmissions of other neighboring packet controllers.

Returning now to FIG. 1, only stations 12 that are not hidden over the horizon can contribute to the interference at a receiver. Hence, the population of stations that are able to interfere with a given receiver is limited to those in the same geographic region. If the earth's surface were perfectly spherical and all antennas were at the same height, the region would be the interior of a circle 14 marked "R". A metropolitan area on flat terrain, or a region nested in a bowl-shaped valley, are exemplary geographical locations where all stations are within direct line-of-sight propagation. In such instances, the circle 14 would represent an entire metropolitan area. Within the circle 14 encompassing an exemplary metropolitan area, propagation follows the $1/r^2$ propagation law, with no interference from any stations outside the circle 14. To estimate the growth in the overall level of interference as the system scales in number, and density, assume M interfering stations are distributed randomly within the circle 14 of radius R, and that stations outside the circle can be ignored. The average density $\rho$ is then $M/\pi r^2$. As the number of stations M increases, so does the average density $\rho$. The distance to nearest neighbors also decreases, remaining proportional to the distance $R_0$, equal to $\rho^{-1/2}$, and defines a neighborhood illustrated by circle 16. The signal level S from such a neighbor at a distance of $\rho^{-1/2}$ transmitting with unit power is:

$$S = \alpha \rho, \quad (1)$$

where $\alpha$ depends on the antennas and wavelength used. Ignoring interference within the neighborhood 16, which is managed separately in accord with the present invention as appears more fully hereinbelow, the background noise level within the neighborhood 16 from all of the other stations with duty cycle $\eta$ that may be on the network inside of the circle 14 is:

$$N = \int_{R_0}^{R} \alpha \frac{1}{r^2} \eta \rho 2\pi r \, dr \quad (2)$$

Combining equations 1 and 2, the signal-to-noise ratio (SNR) is:

$$SNR = \frac{1}{\eta \pi \ln \frac{M}{\pi}} \quad (3)$$

Figure 3:
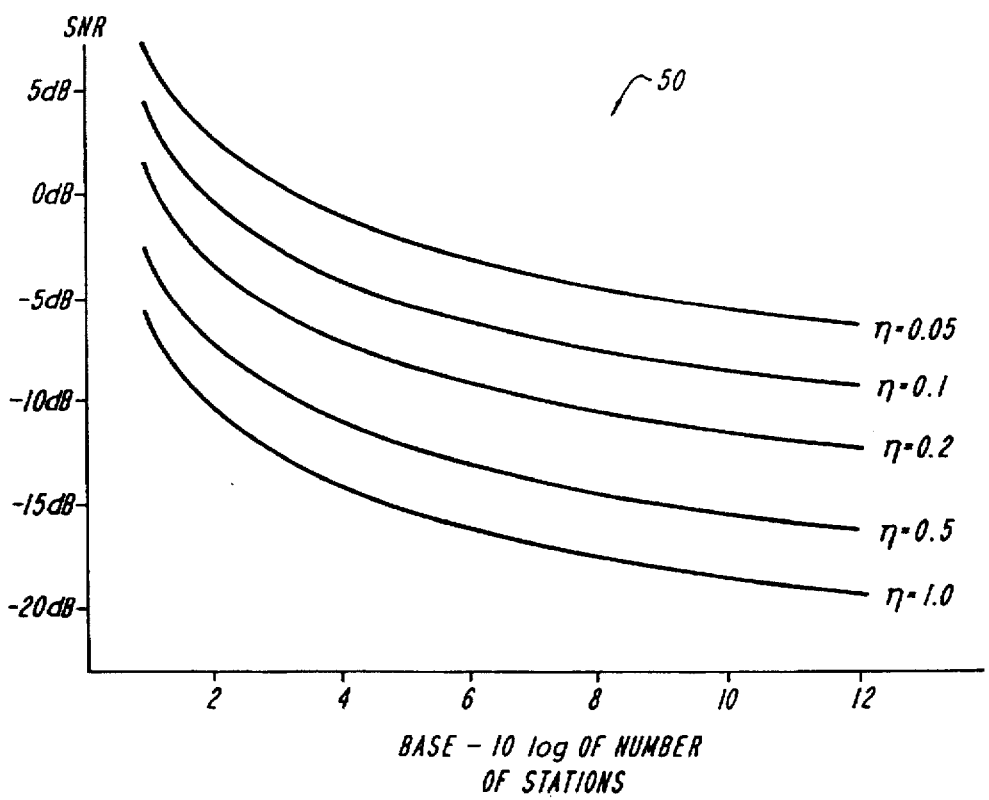
FIG. 3 is a graph of signal-to-noise ratio (SNR) with number of stations (base-10 log) parametrisied with duty cycle useful in explaining how scalability is obtained in accord with the scalable, self-organizing packet radio network having decentralized channel management providing collision-free packet transfer of the present invention.

The expected signal-to-noise ratio of a signal from one of the nearest neighbors depends on ln M (the log of the total number of stations) and $\eta$ (the duty cycle). FIG. 3 shows a plot generally designated 50 of the log of the signal-to-noise ratio as a function of the base 10 log of the number of stations. Note that "noise" means the interference from other stations. As can be seen, the signal-to-noise ratio falls very slowly, approaching minus twenty (−20) dB for $\eta$=one (1) as the number of stations approaches $10^{12}$. The signal-to-noise ratio of a neighbors transmission falls slowly even as the number of stations grows exponentially (even with $\eta$=one (1), it does not reach minus twenty one (−21) dB until $10^{18}$ stations).

Accordingly, for almost any imaginably large population of stations in a packet radio network, direct communication at a definite rate with nearby neighbors (neighbors nearer than $\rho^{-1/2}$) remains possible provided that the stations can cope with signal-to-noise ratios of around minus twenty (−20) dB. As appears more fully hereinbelow, spread-spectrum transmitters in accord with the present invention are disclosed for eliminating at each station packet loss from contention appearing as background noise that arises from all of the stations that may be on the net at a given time within the region marked by the circle 14. The spread-spectrum transmitters introduce a processing gain greater than the expected signal-to-noise ratio of the background noise, thereby eliminating contention arising therefrom in the local area of the net where stations are communicating as illustrated by the circle 16.

If there are many (possibly millions of) stations in an area bounded by the circle 14, the stations in the neighborhood 16 will be immersed in a din of interference. By using spread-spectrum transmitters and receivers in accord with the present invention having a moderately high processing gain in the range of twenty (20) dB to twenty five (25) dB, stations are able to communicate directly with nearby neighbors even as the system scales to an arbitrarily large number of stations. The spread-spectrum transmitters and receivers in accord with the present invention allow the background noise interference from distant stations to be treated as random noise, and no system wide coordination is needed to manage the use of the channel.

By cooperatively forwarding packets, the stations 12 are self-organizing into a fully connected network, which allows communication beyond the immediate neighbors. In any actual network, full connectivity (self-organizability) depends on whether there are enough stations to blanket the area, whether the stations are distributed uniformly enough and what distance can be covered in one hop. For the graph of FIG. 3, it was assumed that any neighbor would be within the neighborhood 16 of the circle of radius $\rho^{-1/2}$ distance away, and that interfering transmissions are at the same power level and are evenly distributed throughout the region 14.

If the stations are randomly and independently located in the plane at density $\rho^{-1/2}$, and if $\rho^{-1/2}$ is the maximum distance that can be covered in a signal hop, then the expected number of neighbors that a station will have is the expected number of stations inside the circle 16 of radius $\rho^{-1/2}$, which is equal to $\pi$. It is reasonable to expect that variations in density will at some stations require reaching farther than to just three (3) expected stations. Doubling the distance to $2\rho^{-1/2}$ to within the circle 18 marked "$2R_0$" should suffice in most situations, which may be obtained by increasing the processing gain of the spread-spectrum transmitters in accord with the present invention by six (6) dB or a factor of four (4). Assuming again uniform distribution, the expected number of reachable stations would then be $4\pi$. This doubling of range comes at the expense of a factor of four (4) in raw throughput since the processing gain has been increased, and any further increase in range (by increased tolerance to interference) would impact throughput (a doubling in range would quadruple the noise-to-signal ratios, reducing raw throughput by a factor of four (4), since achievable throughput depends linearly on signal-to-noise ratios in a noisy system). With the signal-to-noise ratios for stations at $\rho^{-1/2}$ distance in the minus ten (−10) dB to minus fifteen (−15) dB range for reasonable duty cycles, the need to budget around (5) dB of headroom for successful detection in the receiver, and the need for about an additional (6) dB margin for more distant stations, the proper amount of processing gain is determined to lie in the range of about twenty (20) to twenty-five (25) dB to insure network scalability and self-organizability.

Figure 4:
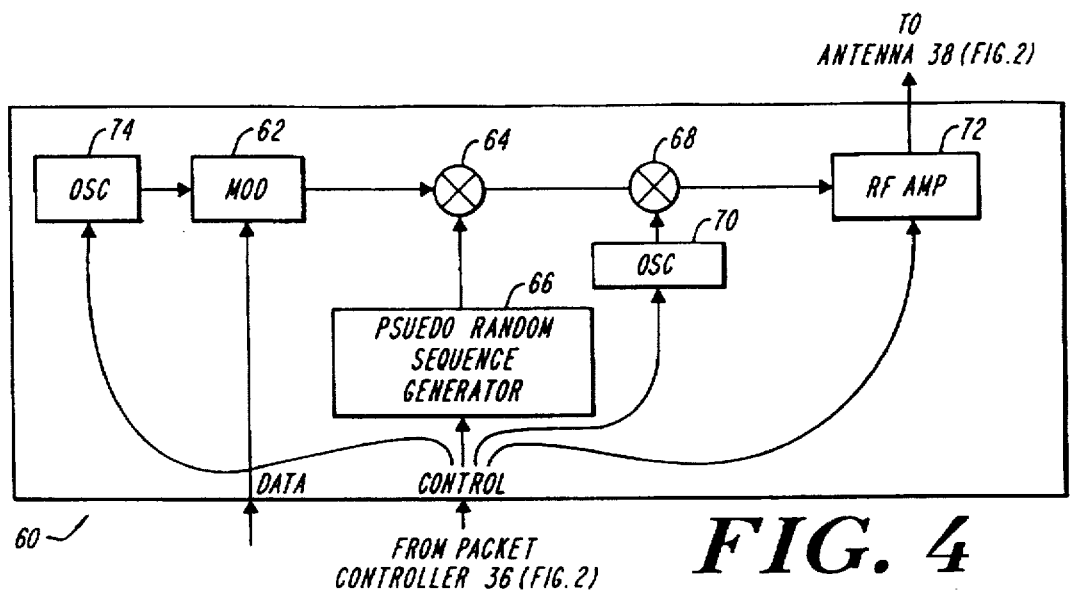
FIG. 4 is a block diagram of an exemplary embodiment of a spread-spectrum transmitter in accord with the scalable, self-organizing packet radio network having decentralized channel management providing collision-free packet transfer of the present invention.

Referring now briefly to FIG. 4, generally designated at 60 is an exemplary embodiment of a spread-spectrum transmitter employing direct sequence coding cooperative with a spread-spectrum receiver to be described to provide the requisite processing gain, although it will be appreciated that other spread-spectrum coding techniques well-known to those skilled in the art could be employed as well without departing from the inventive concepts. The baseband data input from the packet controller 36 (FIG. 2) is fed to baseband modulator 62, the output of which is mixed in a mixer 64 with a direct sequence code produced by pseudo-random sequence generator 66. The direct sequence fast-running pseudo-random bit sequence produced by the pseudo-random generator 66 is known as the "spreading code" and the rate at which it runs in known as the "chip rate." The chip rate is typically an exact multiple of the data bit rate, yielding an integer chips-to-bit ratio. The baseband signal mixed with the chip rate spreading code is fed to mixer 68, which is fed by broadband oscillator 70, and then amplified in a radio frequency amplifier 72 before it is fed to the antenna 38. Baseband modulator 62 is fed by oscillator 74, and control lines from the packet controller 36 (FIG. 2) are connected to the oscillator 74, pseudo-random sequence generator 66, broadband oscillator 70 and radio frequency amplifier 72. The control lines enable to controllably disrupt one or more of the circuit elements 74, 66 and 70 to prevent undesirable in-band interference to the receiver at the same station, and enable power control in a manner described below, by controllably varying the amplification of the amplifier 72. Other techniques known to those of skill in the art to prevent in-band interference may be employed.

Returning now to FIG. 1, as described heretofore, all transmissions of the stations 12 were assumed to be at the same power level. In cases where stations are closer than maximum range, transmitting at full power is excessive. If the stations are controlling power but are still transmitting with the same average power density as before, then the foregoing analysis of average signal-to-noise ratio remains the same. By reducing power in situations were lower power levels can still deliver a sufficient signal-to-noise ratio at the intended receiver, interference to other stations can be reduced, increasing the signal-to-noise ratios in receivers at other stations. A presently preferred power control algorithm is to transmit with sufficient power to deliver a constant pre-determined amount of power to the intended receiver. Other power control techniques, such as transmitting with sufficient power to just achieve the necessary signal-to-noise ratio could also be implemented without departing from the inventive concepts. With the presently preferred power control technique, the network 10 remains scalable and self-organizing.

Packets travelling a distance more than $2\rho^{-\frac{1}{2}}$ are routed through intermediate stations. In the presently preferred embodiment, the criteria used to determine routes prefers short hops, which produces less interference, and avoids skipping over intermediate stations. Since stations may not know where they are geometrically, but are able to observe path gains between themselves as described hereinbelow and construct therefrom entries in the propagation matrix H for the hops that are usable, minimum-energy routing is presently preferred. Minimum-energy routes are straightforward to compute and the heretofore known algorithms for computing min-cost paths in networks can be used to find the least-cost paths in the propagation matrix H, where the costs are the reciprocal of the path gains, such as the so-called "Distributed Asynchronous Bellman-Ford" algorithm, described in Bertsekas et al, supra at pages 325–333, incorporated herein by reference. Other minimum-energy algorithms may be selected, and routing techniques other than minimum-energy routes, may be employed without departing from the inventive concepts.

The spread-spectrum transmitters and receivers in accord with the present invention enable elimination at each station of packet loss from contention appearing as background noise that arises from all of the stations within the radius R that may be on the net at any given time, which elimination is effective for packets transmitted from within the regions (neighborhoods) of the net bounded by the circles 16, 18 with the $\rho^{-\frac{1}{2}}$, $2\rho^{-\frac{1}{2}}$ radii local to the receiving station.

Distributed contention control with neighbors is accomplished in accord with the instant invention as follows. If a collision occurs due to interference from within either of the neighborhoods 16, 18 around the receiver at each station where communication over background noise is otherwise possible, it must fall into one of three cases. A type "1" collision herein, generally designated at 20, is due to the transmission from a station not involved in the exchange of a dropped packet, which is not addressed to the station receiving the dropped packet, where the solid arrow designates the transmission from one station to another, the dashed arrow represents the effect thereof that that transmission has on a neighbor, and an arrow with an "X" through it designates a failed-reception that thereby arises. A type "2" collision herein, generally designated 22, is due to multiple stations attempting to send packets simultaneously to a single station. Again, the arrows with the "X's" therethrough schematically represent the failed-reception resulting from multiple stations within its neighborhood attempting to transmit a packet to the same station. A type "3" collision herein, generally designated 24, is due to a packet arriving at a station while another packet is being transmitted by the receiving station. Type "3" collisions arise from a transmitter contending with its own receiver. The enumeration into the three foregoing types covers all possible cases of an interfering transmission. If the interfering transmission from within a neighborhood does not involve the receiving station either as a receiver or transmitter then it is a type "1" collision. If it does involve the receiving station as the intended target of the interfering transmission, then it is a type "2" collision. If it involves the receiving station as the sender of the interfering transmission, then it is a type "3" collision. Of course, multiple collision types may occur simultaneously.

In accord with the present invention, the spread-spectrum transmitters disclosed hereinabove eliminate most packet loss due to type "1" collisions. This may be seen as follows. If a nearby interfering station is transmitting, and the receiver is already prepared to cope with a signal-to-noise ratio of 1/100 due to the potential overall level of background noise, then in order to significantly increase the level of interference, a nearby station would have to be very near, since a low-power signal added to a high-power signal yields a signal whose power level is not much different then that of the original high-power signal. Even a station at ¼th of the $\rho^{-\frac{1}{2}}$ distance would have only a small effect on the total amount of interference. In most cases, type "1" collision is not a problem, but when it is, it is a local problem, and a processor implemented scheduling technique to be described eliminates at each station packet loss from comparatively-high power transmissions of other neighboring packet controllers.

Type "2" collisions are very similar to type "1" collisions. The only difference is that the intended receiver of the contenting transmissions is located at the same station. In accord with the present invention, type "2" collisions are eliminated by enabling each station to receive multiple transmissions in parallel by means of spread-spectrum radio receivers having multiple tracking and despreading channels.

Figure 5:
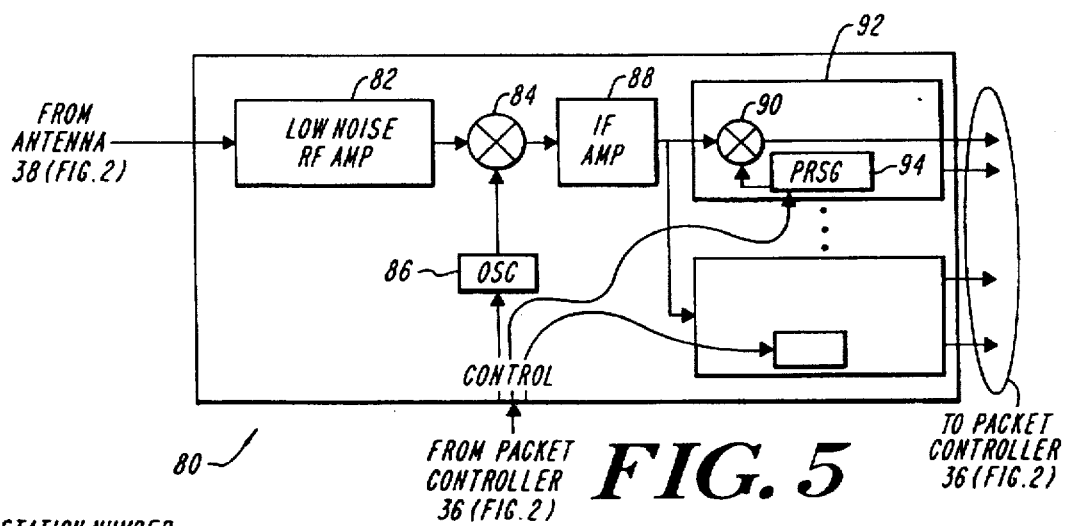
FIG. 5 is a block diagram of an exemplary embodiment of a spread-spectrum receiver having multiple tracking and despreading channels in accord with the scalable, self-organizing packet radio network having decentralized channel management providing collision-free packet transfer of the present invention.

Referring now briefly to FIG. 5, generally designated at 80 is an exemplary embodiment of a spread-spectrum receiver having multiple despreading channels in accord with the present invention. The broadband packet radio signal received by the antenna 38 (FIG. 2) is fed through low-noise amplifier 82 to mixer 84. Mixer 84 downconverts the amplified signal to the IF frequency band, and feeds it to an IF amplifier 86. The mixer 84 is fed by an oscillator 88, which may be the same as the oscillator 70 of FIG. 4. The output of the IF amplifier 86 is fed to the mixers 90 in each of the multiple tracking and despreading channels 92, where it is despread by combining it with the same spreading code as that used by the spread-spectrum encoder of the transmitter 60 (FIG. 4). Downstream narrow-band filters and detectors, not shown, in each despreading channel may be used to isolate the signal and demodulate it to determine the data bits. The bandwidth occupied by the direct sequence spread-spectrum signal of the presently preferred embodiment is roughly equal to the chip rate. The data signals at the output of each of the despreading channels 92 have apparently been amplified over the interfering signal by a factor equal to the original bandwidth divided by the bandwidth of the narrow-band filters. The processing gain is this factor, and is approximately equal to the ratio of the chip rate to the data bit rate. The packet controller 36 (FIG. 2) provides spreading code synchronization and other control information to the pseudo-random sequence generators 94 of the each of the multiple tracking and despreading channels 92 as well as controls the power of the oscillator 86 to turn it on and off. The number of despreading channels needed to eliminate type "2" collisions needs not be larger than the number of neighbors that might communicate directly with the station. This number should be small, since, as we have already seen, only nearby stations will be capable of direct communication over the din of background noise.

Returning now to FIG. 1, as to type "3" collisions 24, the interference from a transmitter located with a receiver is a problem local to the neighborhoods 16, 18 and a processor implemented scheduling technique will now be disclosed to eliminate at each station packet loss from its own transmitter contending with its own receiver for packets from a neighbor. With regard then to interference from the receiving stations own transmitter, the sending station is provided with knowledge of at what times the receiving station may be transmitting. Because the receiver's schedule is known by the sending station, the sending station can choose to send the packet at some other time. In order to make its schedule known to its neighbors, a station (the intended receiver) needs to schedule the times that it may be transmitting and inform its neighbors what those times will be by periodically publishing its unique schedule in a manner described below.

Global clock synchronization is not required. Only the ability to relate one station's clock with another is required. The term "clock" as used herein does not imply knowledge of what time it is. Rather, "clock" just means something like a clock that advances at some known rate. This ability is accomplished in the presently preferred embodiment by having the stations occasionally rendezvous and exchange clock readings. Differences between clocks, and small differences in clock rates, can be mutually modeled, and the resulting models, along with the published transmit schedules, each reckoned by the publishing station's clock, can be used by neighbors to predict when a station will be transmitting. Reference may be had to an article entitled *Time Surveying: Clock Synchronization Over Packet Networks*, Technical Report, MIT/LCS/TR-623, Massachusetts Institute of Technology Laboratory for Computer Science, (May 1994), for a description of how the drift of a clock driven by a quartz oscillator can be modeled from historical data and for a demonstration of how the model can then be used to accurately predict future drift, incorporated herein by reference.

The processor implemented first scheduling technique in accord with the presently preferred embodiment of the present invention to eliminate at each station packet loss from its own transmitter contending with its own receiver for packets from a neighbor when it is transmitting to an intended recipient is as follows. Each station independently produces and publishes a unique schedule of transmit and receive opportunities for itself. The unique schedule published by a station is a commitment by that station to listen (refrain from transmitting) at particular times in the future (during the receive windows). A station with a packet to be sent directly to another station then compares its own schedule with the receiving station's schedule and sends the packet during a time when one of its own transmit windows overlaps with a receive window of the receiving station enough to handle the packet length. Each station only needs to be aware of the schedules of the immediate neighbors to which it might be directly sending packets in the neighborhoods 16, 18, and no global synchronization is required.

In the presently preferred embodiment, choosing unique schedules in a distributed manner and without any global coordination is accomplished by using schedules that are random or pseudo-random in nature. By having each station independently choose a random schedule, the schedules allow many opportunities to communicate between any pair of stations.

One presently preferred method of implementing pseudo-random schedules is now presented. Implementing the pseudo-random schedules requires a technique of generating the random schedules and a technique of communicating the schedules and the clock readings to neighbors. If each station's clock is set differently, then the stations may all use the same schedule, each reckoned by its own clock. With all stations using the same schedule, then only the clock readings need to be communicated between stations. Time may then be divided into equal size slots, again reckoned independently by each station's clock, and each slot designated to be either a transmit or receive window.

The schedule, a binary-valued function of a clock reading, singular since all may be the same, may advantageously be implemented by dividing time into equal-length transmit and receive windows of length $T_{slot}$, with all times in a slot sharing the same value (transmitting or receiving). Whether a particular slot is for transmitting or receiving may be determined by using a hash function to hash the value of time at the beginning of the slot. If the hash value is less than a threshold, then the slot is a receive slot; otherwise it is a transmit slot. The hash function selected must have a suitably-low self-correlation. A presently preferred hash function is $hash(x)=x^{17} \mod 2^{31}-1$. The threshold is selected to achieve a desired duty cycle. The receive duty cycle, p, is the probability that a slot is a receive slot. The presently preferred way to set the clocks so that they are different is to set them independently to a random value. The probability that a station's clock may by chance be set to a value that is close enough to the value of a neighbor's clock to cause trouble may be made arbitrarily small by increasing the number of significant high-order bits in the clock. Each additional high-order bit added and initialized randomly will reduce the probability by a factor of two (2).

Figure 6:
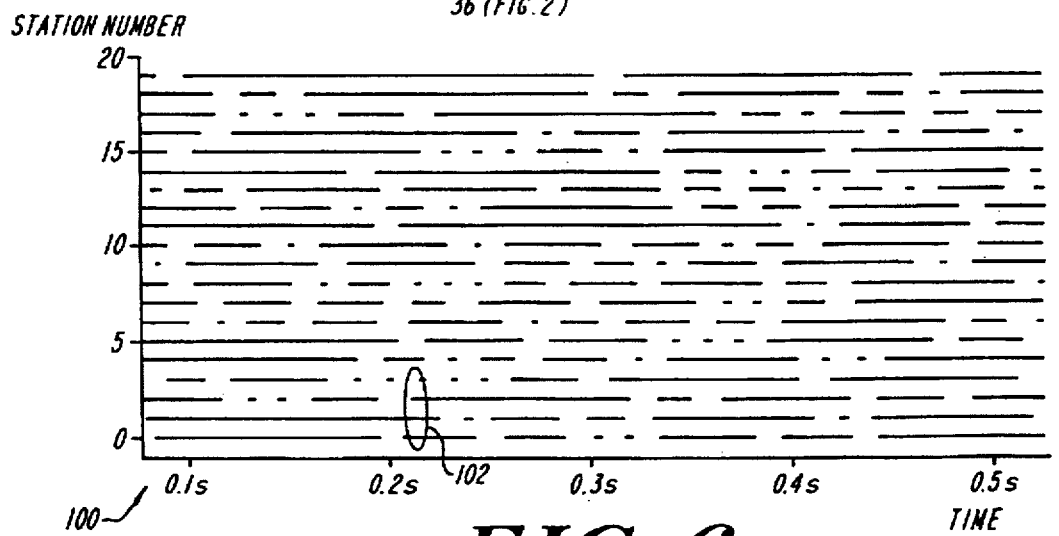
FIG. 6, 7 are graphs illustrating the presently preferred embodiment of the unique schedules of the processor implemented scheduling techniques of the scalable, self-organizing packet radio network having decentralized channel management providing collision-free packet transfer in accord with the present invention.

Referring now briefly to FIG. 6, generally designated at 100 is a plot of a pseudo-random schedule for twenty (20) stations of the presently preferred embodiment of the processor implemented first scheduling technique in accord with the present invention. The line is drawn in slots where a station is scheduled to transmit, and a line is omitted in slots where the station is scheduled to listen. Note that during a transmit slot a station is under no obligation to transmit but may do so if it has traffic to send. The receive slots however are obligations to refrain from transmitting so that receptions are possible. The receive duty cycle, the average fraction of slots that is scheduled for listening, is here 0.3. To send a packet from one station to another, it is scheduled in accord with the processor implemented first scheduling technique to fit in a period of time when the sending station is allowed to transmit and when the receiving station is listening. For example, at the circled time 102 in FIG. 6, station "0" could not send to station "1" or station "2," but could transmit to station "3."

Figure 7:
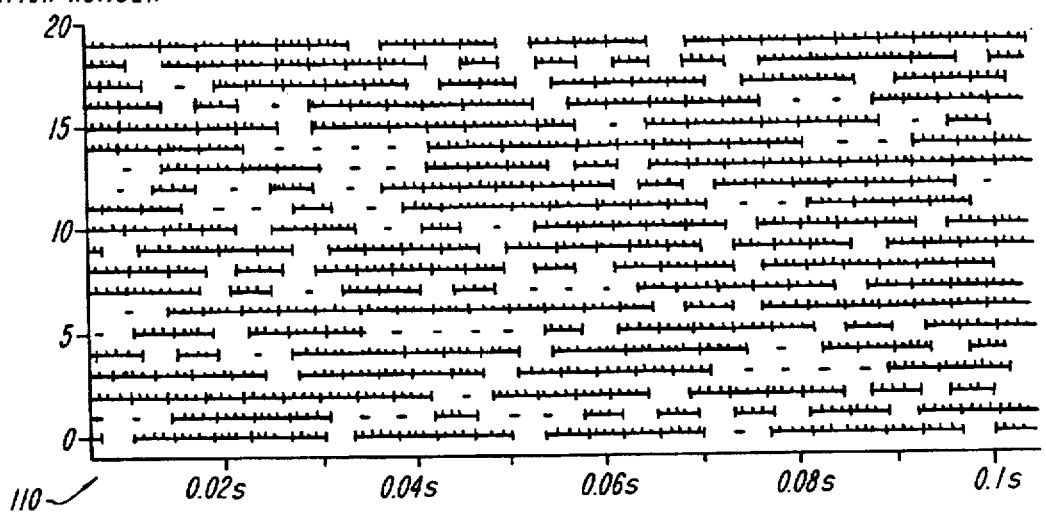

Referring now briefly to FIG. 7, generally designated at 110 is a graph of schedules useful in explaining one presently preferred embodiment of scheduling packets for transmission in accord with the processor implemented first scheduling technique of the present invention. Each transmit slot is divided into a whole number of fixed-sized subslots, each just large enough to carry a maximum sized packet. Packets are then scheduled into the first available slot at the transmitter which overlaps a receive window at the intended receiver.

Returning now to FIG. 1, the above-described processor implemented first scheduling technique avoids collisions of the type "3" designated at 24 arising from interference from a station's own transmitter, the above-described spread-spectrum receivers having multiple tracking and despreading channels eliminate the collisions of the type "2" and designated 22, and the above-described spread-spectrum transmitters, receivers and power control technique eliminate most collisions of the type "1" and designated 20. Now, a processor implemented second scheduling technique is described to eliminate collisions arising from interference by comparatively-high power (or very near) transmitters (whether the effect of a comparatively-high power transmission of a neighbor is significant or not will depend on how much processing gain the stations are using).

The power levels of signals are typically discussed in terms of decibels (dB), a logarithm of the power level. The power levels of neighboring high-powered transmitters add, but not the logarithms of the powers. For example, if two signals, one at a power level of twenty (20) dB and the other at a power level ten (10) dB are added, the power level of the resulting signal is at twenty and four-tenths (20.4) dB, which is a barely significant change. In order for the addition of a weak signal to increase the overall level of interference by more than one (1) dB, its power level must be at least ¼th the power level of the overall interference. One (1) dB, which is about a twenty-five percent (25%) change, may be taken as an exemplary threshold of significance. It would then take more than four (4) simultaneous comparatively-high power transmissions, each contributing just under the exemplary one (1) dB threshold from nearby neighbors, to have more than a three (3) dB effect on the overall level of interference.

Only in infrequent circumstances will a neighbor's transmission increase the level of interference by more than the one (1) dB exemplary threshold. As described hereinabove, the background level of noise may be roughly a factor of one-hundred (100) greater (up by twenty (20)) dB than the level of individual signals received from nearby stations. Stations already must cope with this level of interference. In order for an interfering station to significantly increase (by more than the exemplary one (1) dB threshold) the total amount of interference, it would have to deliver more than twenty (20) times (or thirteen (13) dB more) the amount of power that it is delivering to the intended recipient. Assuming $1/r^2$ propagation, this threshold will be exceeded only when the receiving station is more than five (5) times as far away as the interferee. If the most distant stations in a neighborhood are at the distance $2\rho^{-\frac{1}{2}}$, the expected number of stations within a radius of one-fifth this distance is only about one-half (0.5). This number is well under the interference threshold for four (4) nearby transmitters of the presently preferred embodiment. Therefore, this form of interference will not often be a problem.

When high-power must be used, an additional constraint is placed on the scheduling to avoid interfering with a neighbor's reception in accord with the processor implemented second scheduling technique of the present invention. Those packet transmissions that require high-power are not scheduled at a time that overlaps with a receive window at a neighbor who is too close. In a presently preferred embodiment of the processor implemented second scheduling technique, station$_k$ is too close to station$_j$ for station$_i$ to send to station$_j$ during a receive window of station$_k$ if $h_{i,j}^2 < 20\, h_{i,k}^2$, where "h" is the path gain. The factor of twenty (20) means that if the signal at a nearby neighbor will be more than thirteen (13) dB above the usual reception power level, it cannot be sent during that neighbor's receive windows. Of course, other maximum power thresholds can be employed without departing from the inventive concepts.

Figure 8A:
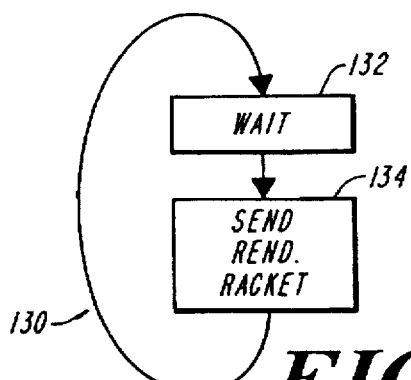
Figure 8B:
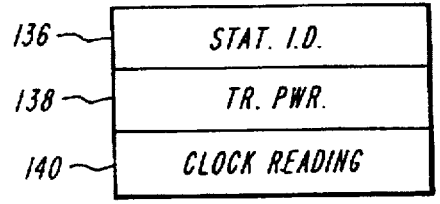

Referring now to FIG. 8A, generally designated at 130 is a flow chart illustrating a background routine of the packet controller 36 (FIG. 2). As shown by a block 132, the packet controller waits until it periodically sends a rendezvous packet as illustrated by a block 134. As shown by a block 136 in FIG. 8B, each rendezvous packet includes information representative of the identity of that station, information as illustrated by a block 138 representative of the power used to transmit the rendezvous packet and, as illustrated by a block 140, information representative of the clock value of the sending station.

Figure 9A:
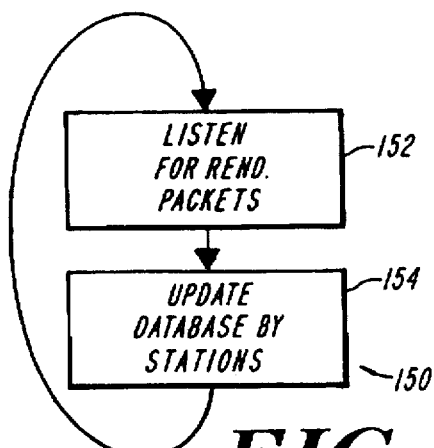
Figure 9B:
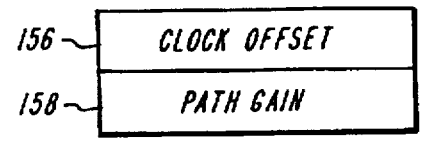

Referring now to FIG. 9A, generally designated at 150 is a flow chart illustrating another background routine of the packet controller 36 (FIG. 2). As shown by a block 152, the packet controller at each station listens for rendezvous packets. As shown by a block 154, upon receipt of a rendezvous packet, the packet controller updates its database of nearby stations, then processing returns to the block 152. As shown by the block 156 in FIG. 9B, the database it maintains for each station includes information representative of the clock offset and information representative of the path gain to that station as shown by a block 158.

Referring now to FIG. 10, generally designated at 170 is a flow chart illustrating an interrupt routine of the packet controller 36 (FIG. 2). As shown by a block 172, processing in the background processing routines is interrupted when a packet arrives. As shown by a block 174, the packet controller then determines the next hop for the received packet from the routing tables. As shown by a block 176, the packet controller then schedules the packet for departure at a time compatible with the schedule at the next hop station by comparing its unique schedule with that of the intended recipient to determine the first available listening window thereof that has not been previously scheduled. As shown by a block 178, the packet controller waits until that time, and as shown by a block 180, sends the packet to the intended recipient at that time.

Referring now to FIG. 11, generally designated at 190 is a subroutine called by the packet controller 36 (FIG. 2) during processing in the step 176 (FIG. 10). As shown by a block 192, at the time when a packet is received by the transmitting station, it looks at its unique schedule to determine whether the next subslot it is a transmit subslot. As shown by block 194, if it is a transmit subslot, processing branches to the block 196, but if not, processing returns to the block 192.

If it is a transmit slot, the packet controller determines whether this subslot is contained within a receive window at the intended receiver as shown by block 196. If not, processing returns to the block 192.

If it is, the packet controller determines whether that transmit subslot is already booked as shown by a block 198. If it is already booked, processing returns to block 192. If not, as shown by block 200, the packet controller determines whether the power of the required transmission would interfere with the receive windows of any neighbors. If it would, processing returns to block 192. Otherwise, an acceptable subslot in which to send the packet has been found and the packet is scheduled to be sent in that subslot as shown by a block 202.

Many modifications of the presently disclosed invention will become apparent to those skilled in the art having benefitted by the instant disclosure.

What is claimed is:

1. A scalable, self-organizing packet radio network station providing decentralized collision-free packet transfer between stations, comprising:

first means for eliminating at each station packet loss from contention appearing as background noise that arises from all of the stations that may be on the network at any given time; and second means for eliminating at each station packet loss caused by its own transmitter contending with, at its own receiver, receptions of packets from one or more neighboring stations;

wherein said second means includes a processor implemented first scheduling technique; and wherein the processor implemented first scheduling technique (i) generates at each station a schedule of transmit opportunities and receive opportunities during which it obliges itself to listen, which schedule is unique to each station and asynchronous with that of other stations, (ii) publishes its unique schedule to the other neighboring stations, (iii) compares its unique schedule of transmit and receive opportunities with that of a neighboring station intended to receive the transmission to determine when packets may be transferred thereto during a receive opportunity thereof without collision and (iv) transmits its packets thereto at such times.

2. The invention of claim 1, further including third means for eliminating at each station packet loss due to interference from comparatively-high power transmission of one or more neighboring stations.

3. The invention of claim 1, wherein said first means includes a spread-spectrum transmitter providing a spread-spectrum processing gain selected to be greater than the average background signal-to-noise ratio of all stations that may be on the network.

4. The invention of claim 3, wherein the spread-spectrum transmitter implements direct sequence coding.

5. The invention of claim 1, wherein the generation at each station is implemented by a pseudo-random schedule generator common to all stations and by a pseudo-randomly initialized clock unique to each station, wherein each station periodically exchanges rendezvous packets with neighboring stations that include information representative of each station's unique clock, and wherein the comparison at each station of its unique schedule of transmit and receive opportunities with that of the intended recipient station is implemented by generating at each station the unique schedule of transmit and receive opportunities of the intended recipient station from that station's unique clock.

6. The invention of claim 5, wherein the random generation is implemented by a binary-valued function of a clock reading.

7. The invention of claim 6, wherein the information representative of each station's unique clock is its clock reading.

8. The invention of claim 6, wherein each station's unique schedule of transmit and receive opportunities has equal length transmit and receive opportunities.

9. The invention of claim 8, wherein each transmit opportunity is divided into a plurality of transmit subslots.

10. The invention of claim 9, wherein each subslot is made equal in length to the maximum packet length.

11. The invention of claim 2, wherein said third means includes a processor implemented second scheduling technique.

12. The invention of claim 11, wherein the processor implemented second scheduling technique (i) generates at each station a schedule of transmit opportunities and receive opportunities during which it obliges itself to listen, which schedule is unique to each station and asynchronous with that of other stations (ii) publishes its unique schedule to other neighboring stations, (iii) compares its schedule of transmit and receive opportunities with that of an intended neighboring station and with those of one or more other neighboring stations to determine when a transmit opportunity first arises that does not overlap with any receive opportunity of the one or more neighboring stations so that packets may be transferred to the intended neighboring station without causing collision at one or the other neighboring stations and (iv) transmits its packets to the intended station at such times.

13. The invention of claim 12, wherein the generation at each station is implemented by a pseudo-random schedule generator common to all stations and by a pseudo-random clock unique to each station, wherein each station periodically exchanges rendezvous packets with neighboring stations that include information representative of each station's unique clock, and wherein the comparison at each station of its unique schedule of transmit and receive opportunities with that of the intended recipient station and with those of the one or more neighbor stations is implemented by generating at each station the unique schedule of transmit and receive opportunities of the intended recipient station and of the one or more neighbor stations from those station's unique clock.

14. The invention of claim 13, wherein the random generation is implemented by a binary-valued function of a clock reading.

15. The invention of claim 14, wherein the information representative of each station's unique clock is its clock reading.

16. The invention of claim 13, wherein each station's unique schedule of transmit and receive opportunities has equal length transmit and receive opportunities.

17. The invention of claim 16, wherein each transmit opportunity is divided into a plurality of transmit subslots.

18. The invention of claim 17, wherein each subslot is made equal in length to the maximum packet length.

19. The invention of claim 6, wherein the binary-valued function of a clock reading utilizes a hash function.

20. The invention of claim 14, wherein the binary-valued function of a clock reading utilizes a hash function.

21. The invention of claim 1, further including fourth means for eliminating at each station packet loss caused by multiple other neighboring stations that may be sending generally simultaneously with a given station at a given time.

22. The invention of claim 1, wherein said generation is random generation.

23. A self-organizing packet radio network station providing decentralized packet transfer between stations, comprising:

a processor; and a processor implemented first scheduling technique which
      (i) generates at each station a schedule of transmit opportunities and receive opportunities during which it obliges itself to listen, which schedule is unique to each station and asynchronous with that of other stations, (ii) publishes its unique schedule to the other neighboring stations, (iii) compares its unique schedule of transmit and receive opportunities with that of a neighboring station intended to receive the transmission to determine when packets may be transferred thereto during a receive opportunity thereof without collision and (iv) transmits its packets thereto at such times.

24. The invention of claim 21, wherein said fourth means includes a spread-spectrum receiver having multiple tacking and despreading channels.

* * * * *